United States Patent [19]
Papaleo et al.

[11] Patent Number: 5,129,589
[45] Date of Patent: Jul. 14, 1992

[54] TABLE-TOP MULTI-PURPOSE DEVICE DRIVEN BY MEANS OF AN IMMERSION BLENDER

[75] Inventors: Sergio Papaleo; Prato Giovanni, both of Milan, Italy

[73] Assignee: Eleday Export S.r.l., Milan, Italy

[21] Appl. No.: 627,772

[22] Filed: Dec. 14, 1990

[30] Foreign Application Priority Data

Sep. 7, 1990 [IT] Italy .................. 21712/90[U]

[51] Int. Cl.⁵ .................................. A47J 43/046
[52] U.S. Cl. .................................. 241/37.5; 241/92;
241/101.1; 241/101.2
[58] Field of Search ............... 366/200, 224, 344, 601;
241/37.5, 36, 92, 101.2, 101.1, 282.1, 282.2

[56] References Cited

U.S. PATENT DOCUMENTS 2,896,924 7/1959 Jepson .................. 241/101.1
4,700,903 10/1987 Henn .................. 241/101.2

FOREIGN PATENT DOCUMENTS 2000171 7/1971 Fed. Rep. of Germany ... 241/101.1
19117 5/1976 Japan .................. 241/101.1
159678 7/1957 Sweden .................. 241/101.2

*Primary Examiner*—P. W. Echols
*Attorney, Agent, or Firm*—Finnegan, Henderson, Farabow, Garrett & Dunner

[57] ABSTRACT

A table-top multi-purpose device (10), for cutting, chopping, grating, squeezing or whipping foodstuffs, comprises a rotating element (19) for processing the foodstuffs placed therein, a drive mechanism (16) for transmitting movement to the element (19) includes an element (15) which engages with the end of the rotating shaft (22) of an immersion type blender (11) disposed in a housing (12), and a safety device (21) for preventing the blender (11) from being inserted in the housing (12) when the lid (23) of the device (10) is not tightly closed in place.

11 Claims, 2 Drawing Sheets

TABLE-TOP MULTI-PURPOSE DEVICE DRIVEN BY MEANS OF AN IMMERSION BLENDER

There are known electric blenders of the so-called immersion type, that is to say, comprising a handgrip, containing an electric motor, from which extends a shank to be immersed in the liquid to be blended and provided at its free end with an interchangeable rotating element. These blenders are very practical for their specific purpose, but cannot at the present time completely replace normal table-top blenders and the much more expensive multi-purpose electrical appliances in general, which carry out such operations as slicing fruit and vegetables, squeezing citrus fruit, centrifuging, grating, etc.. Said immersion-type blenders are however, for numerous uses, much more practical and easier to handle and users are therefore very often obliged to sustain the expense of both types of appliance in order to satisfy all their needs.

The general scope of this invention is to obviate the aforementioned problems by providing an accessory for immersion-type blenders which enables them to be used in place of normal table-top multi-purpose electrical appliances at a much lower cost than the otherwise necessary double purchase of appliances. This scope is achieved, according to the invention, by providing a table-top multi-purpose device, in particular for cutting, chopping, grating, squeezing or whipping foodstuffs comprising a rotating element for processing foodstuffs placed therein, characterized by the fact of comprising a drive mechanism for transmitting movement to said element which comprises an element which couples onto the end of the rotating shaft of an immersion-type blender.

The innovatory principles of this invention and its advantages with respect to the known technique will be more clearly evident from the following description of a possible exemplificative and non-restrictive embodiment applying such principles, with reference to the accompanying drawings, in which.

With reference to the figures, a device, generically indicated by reference 10, made according to the innovatory principles of this invention, constitutes an accessory of an electric immersion blender 11 of known technique.

Figure 1:
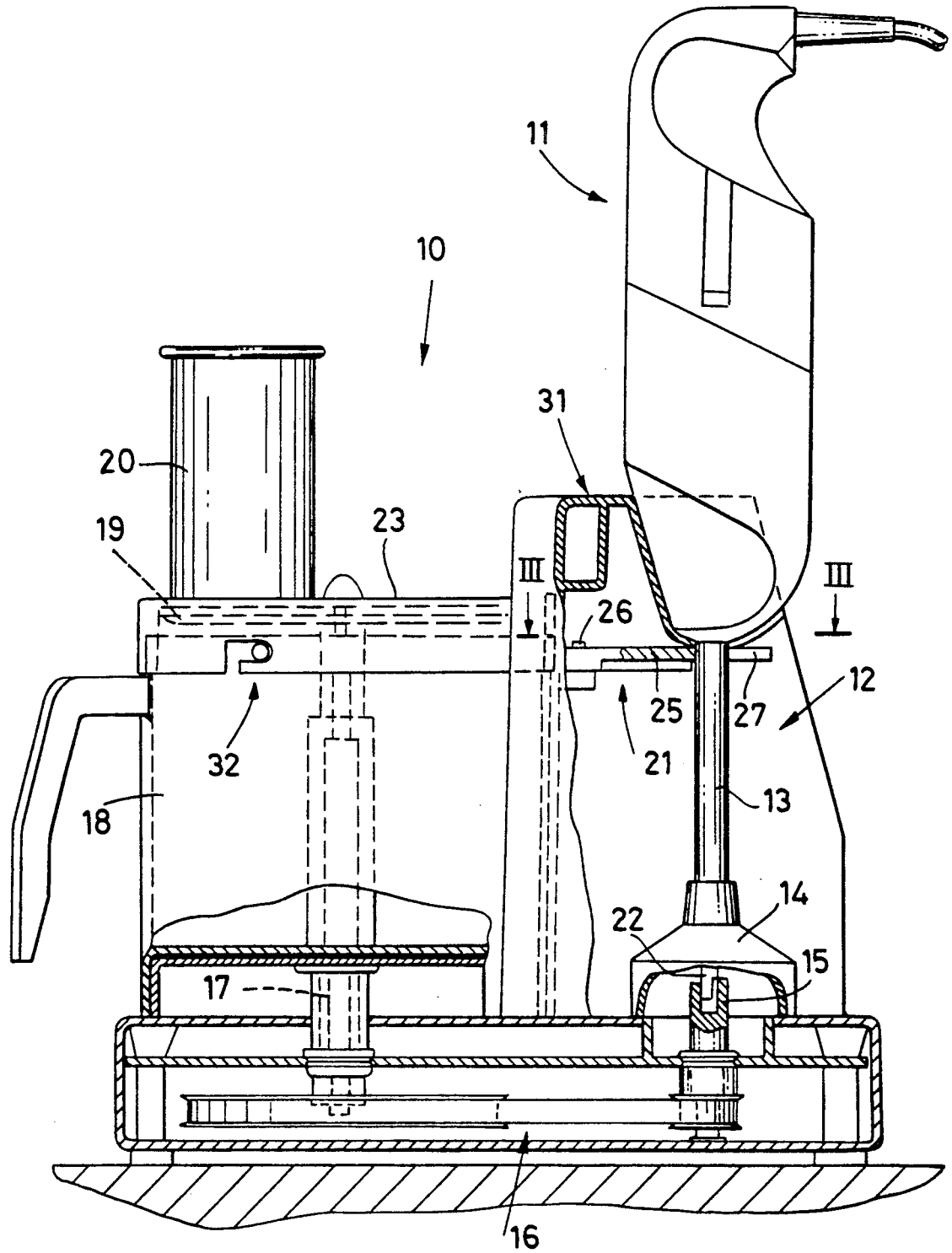
FIG. 1 shows a side elevation partial cross-sectional view along the line I—I of FIG. 2, of a device according to the invention.

As can be clearly seen in FIG. 1, the device 10 comprises a housing 12 circumscribed by a shaped support 31 which is open at the side and the top to receive the shank 13 of the blender 11, so that the blender 11 is supported in position with the protective cup 14 resting on a surface from which protrudes a coupling 15 which engages with the pivot pin 22 which is usually provide for connecting the blades, whisks, etc., normally supplied with these types of blenders.

The coupling 15 is connected, by means of a drive system 16, for example of the toothed belt type, to a pivot 17 protruding vertically from the base of the device so as to fit into a container 18 and operate interchangeable rotating elements for whipping, cutting, chopping etc., as, for example, indicated schematically by reference 19. The container 18 comprises an upper lid 23 with a vertical duct 20 for introducing the foodstuffs to be processed, the lid comprising means 32 for fastening it to the container, for example represented by an L-shaped slot and a corresponding pin which fits into the latter by rotation of the lid.

The container 18 and the rotating and fixed elements to be inserted into it can be the ones generally used in the known technique for small table-top domestic electrical appliances and will therefore be neither further shown nor described since they can be easily imagined by any technician.

The device 10 advantageously comprises a safety mechanism 21 which prevents it from being used without the lid 23 which is provided to form a protection between the user and the rotating elements 19.

Figure 2:
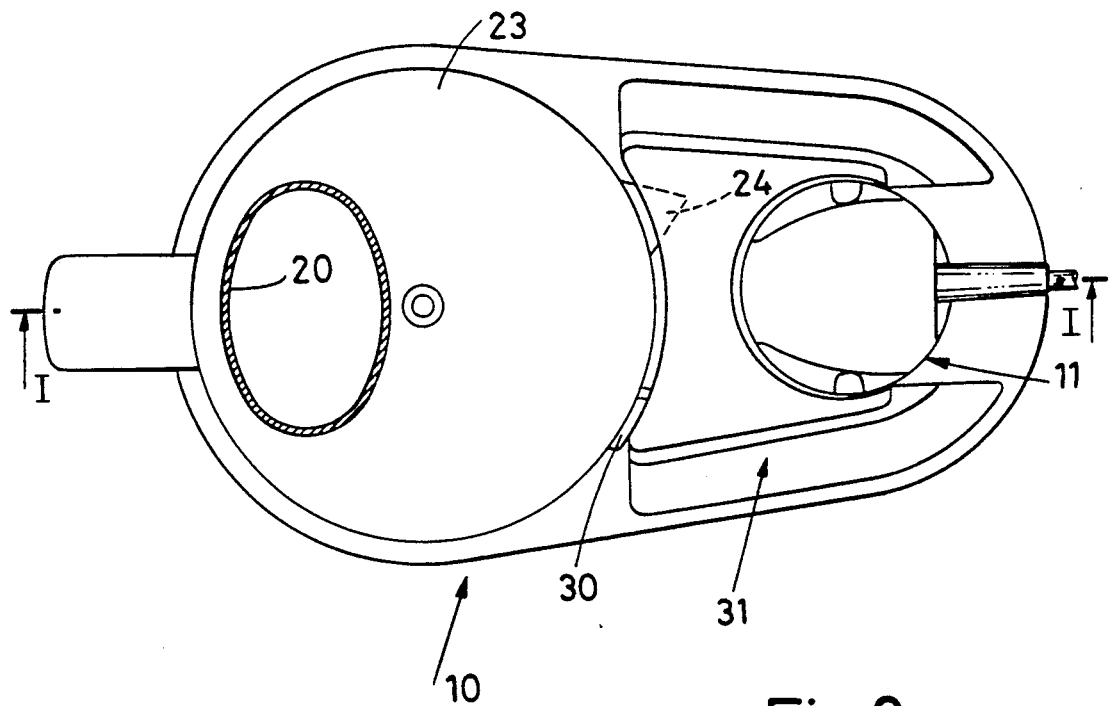
FIG. 2 shows a plan view of the device of FIG. 1.
Figures 3, 4:
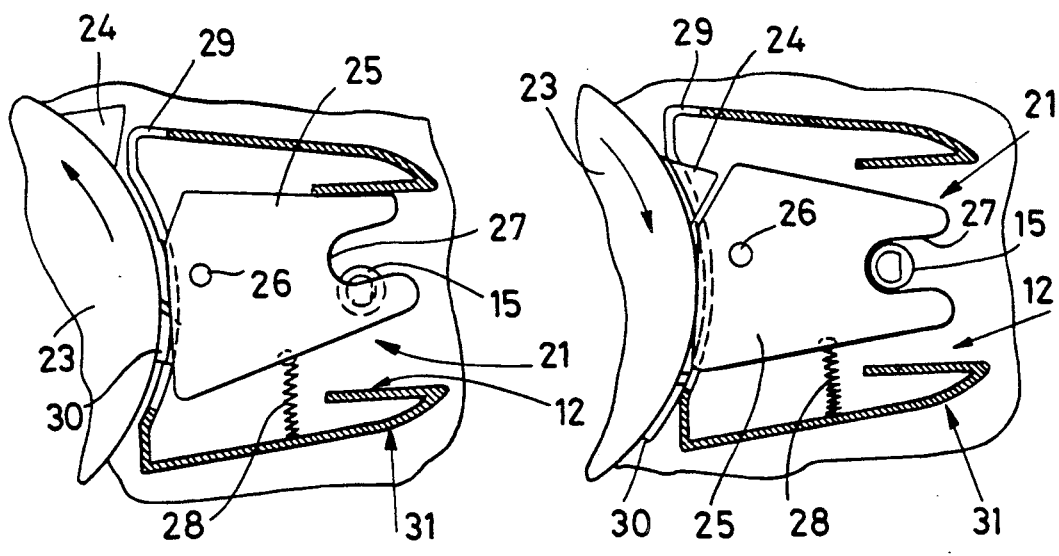
FIGS. 3 and 4 show schematic views of two different operating conditions of a detail of the device of FIG. 1.

Said safety mechanism comprises a tongue 24 protruding laterally from the lid 23 as shown by the broken line in FIG. 2 and more clearly in FIGS. 3 and 4. In the latter two figures the mechanism is shown in greater detail by means of a cross-section along the line III—III of FIG. 1. In this cross-section the blender 11 has been removed.

The mechanism 21 comprises a forked-shaped element 25, pivoted on 26 and having a recess 27 for the shank 13 of the blender. When the lid is removed or positioned incorrectly, a spring 28 pushes the element 25 into the position shown in FIG. 3 so that the recess 27 is no longer aligned with the coupling 15.

In this condition it is not possible to fit the blender 11 into the housing 12 and the pin 22 is consequently prevented from fitting into the coupling 15. As shown in FIG. 4, when the lid 23 is turned to the closed position (in a clockwise direction with respect to the figures) so as to engage the means 32, the tongue 24 fits into a slot 29 and comes into contact with the element 25, pushing it, against the action of the spring 28, so as to align the recess 27 with the coupling 15. Simultaneously, as it shifts, the forked-shaped element 25 comes into contact with a tooth 30 on the lid, thus preventing the anticlockwise rotation of the lid and consequently its removal.

Once the forked recess 27 and coupling 15 are aligned, it is possible to insert the blender 11 which, when operated, sets the elements 19 in the container 18 rotating, thus making it possible to carry out the various processing operations in the same way as with a normal table-top multi-purpose electrical appliance.

After use, in order to re-open the lid it is necessary to remove the immersion blender from the housing 12 so that by an initial slight rotation of the lid the tongue 24 shifts sufficiently to enable the fork-shaped element 25 which is no longer restrained by the shank 13 of the blender, to rotate and shift away from the path of the tooth 30. In this condition, the lid is once again free to rotate completely to enable it to be removed. The container can then be removed so that its contents can be poured out and it can be washed. At this point it is clear that the aforementioned objects are achieved. Any immersion blender can be applied to a device 10 made according to the invention, to obtain the same functions as table-top multi-purpose electrical appliances. Moreover, since the part electrically driven (with all the connected devices, such as switches, power cables, speed regulators, etc.) consists of the immersion blender, the accessory 10 is much less expensive than a conventional table-top electrical appliance, which must necessarily comprise all the electrically-driven parts.

The foregoing description of an embodiment applying the innovatory principles of this invention is obviously given by way of example in order to illustrate such innovatory principles and should not therefore be considered as a limitation to the sphere of the invention claimed herein. For example, the container 18 can be differently shaped, in particular in order to adapt to specific uses. For example, in the case of a citrus-fruit squeezer, the container 18 shown in the figures can be replaced by the classical container comprising an upper ribbed element which is generically cone-shaped and rotating in order to remove the pulp from the halved citrus fruit. Likewise, for the preparation of milk shakes, the container 18 can be replaced by a vertically taller container with rotating blades disposed on the bottom. All these variations to the container 18 are in any case technically known and easily imaginable by any expert technician. The drive system 16 can obviously also be made with toothed gearing rather than with belts. Lastly, the coupling 15 can be shaped differently in order to fit onto pivots different from the pivot 22 shown. For example, it could consist of a forked coupling 15 which fits directly onto rotating blades or the like connected to the pivot 22.

We claim:

1. Table-top multi-purpose device for processing foodstuffs, the device comprising a housing including means for receiving an immersion-type blender of the kind being hand-held, the blender having a substantially cylindrical contoured body part and a fixed rotating shaft with an exposed end extending from the contoured body part; a rotating element for processing foodstuffs; and a drive mechanism for transmitting movement to said element, said drive mechanism comprising an element configured to couple onto the end of the rotating shaft of the immersion-type blender, said housing receiving means including a shaped support for conformingly contacting the contoured immersion-type blender body part and for spacing the body part a distance from said coupling element corresponding to the length of the fixed rotating shaft.

2. Device as claimed in claim 1, wherein the coupling element is at the bottom of said housing, and wherein said housing receiving means orients the shaft of the immersion blender in a substantially vertical orientation.

3. Device as claimed in claim 1, wherein the drive mechanism comprises a belt drive.

4. Device as claimed in claim 1, wherein the device further includes a removable container operatively connected to said housing, and wherein the rotating element is disposed in said removable container.

5. Device as claimed in claim 4, wherein the container comprises a mouth and an upper lid with fastening elements operated by turning the lid to a position in which it engages the mouth of the container.

6. Device as claimed in claim 5, further comprising means for preventing the lid from shifting from the engaged position which are actuated by the presence of the immersion blender in the housing.

7. Table-top multi-purpose device for processing foodstuffs, the device comprising a housing including means for receiving an immersion-type blender of the kind being hand-held, the blender having a fixed extending rotating shaft with an exposed end; a rotating element for processing foodstuffs; and a drive mechanism for transmitting movement to said element, said drive mechanism comprising an element configured to couple onto the end of the rotating shaft of the immersion-type blender, wherein the device further includes a removable container operatively connected to said housing, wherein the rotating element is disposed in said removable container, and wherein the container comprises a mouth and an upper lid with fastening elements operated by turning the lid to a position in which it engages the mouth of the container, the device further comprising means for preventing insertion of the immersion-type blender into the housing and the coupling of the rotating shaft to said coupling element, which insertion and coupling preventing means are actuated whenever the lid is not in the engaged position.

8. Device as claimed in claim 1, wherein the means preventing the insertion and coupling comprise operative protrusions on said lid, a spring, and an element which is movable against the action of said spring when the lid is rotated to the engaged position, by contact with said operative protrusions on the lid, said movable element being movable from a position in which it interferes with the insertion of the immersion blender into said housing to a position in which it does not interfere with insertion into the housing.

9. Device as claimed in claim 8, wherein the movable element comprises a fork member pivotably mounted on said housing and having a recess, which fork member, when in the non-interfering position, aligns said recess to receive the shaft of the immersion blender.

10. Device as claimed in claim 7, further including means for preventing shifting of the lid from the engaged position which comprise a tooth on the lid which prevents rotation and disengagement of the lid by interfering with the insertion and coupling preventing means when the immersion blender is present in the housing.

11. Table-top multi-purpose device for operation with a hand-held immersion blender of the type having a rotary drive means, for processing foodstuffs, the device comprising:

a housing including means for receiving into an inserted position the immersion blender, and further including a container portion and a lid engageable with said container portion in a predetermined engaged position;

a rotating element disposed in said container portion; and a drive mechanism for transmitting movement to said rotating element, wherein said drive mechanism includes means for coupling to the rotary drive means of the immersion blender when in the inserted position for transmitting rotary motion from the immersion blender to said drive mechanism, and wherein said receiving means includes means for preventing insertion of the immersion blender into said housing when said lid is not in said predetermined engaged position.

* * * * *

UNITED STATES PATENT AND TRADEMARK OFFICE
CERTIFICATE OF CORRECTION

PATENT NO. : 5,129,589

DATED : July 14, 1992

INVENTOR(S) : Sergio Papaleo; Giovanni Prato

It is certified that error appears in the above-identified patent and that said Letters Patent is hereby corrected as shown below:

Claim 8, column 4, line 19, "claim 1" should read --claim 7--.

Signed and Sealed this

Twenty-first Day of September, 1993

Attest:

BRUCE LEHMAN

*Attesting Officer*      *Commissioner of Patents and Trademarks*